(12) United States Patent  (10) Patent No.: US 7,634,973 B1
Cribb et al.  (45) Date of Patent: Dec. 22, 2009

(54) PET BOWL ASSEMBLY

(76) Inventors: Nancy J. Cribb, 2004 SW. 35th Ave., Delray Beach, FL (US) 33445; Sean J. Cribb, 2004 SW. 35th Ave., Delray Beach, FL (US) 33445

( * ) Notice: Subject to any disclaimer, the term of this patent is extended or adjusted under 35 U.S.C. 154(b) by 0 days.

(21) Appl. No.: 12/201,207

(22) Filed: Aug. 29, 2008

Related U.S. Application Data

(63) Continuation-in-part of application No. 11/588,541, filed on Oct. 27, 2006.

(51) Int. Cl.
*A01K 7/00* (2006.01)
(52) U.S. Cl. .................................. 119/51.5; 119/61.5
(58) Field of Classification Search ............... 119/51.5, 119/61.5, 61.53, 61.54, 61.55, 61.56, 61.57
See application file for complete search history.

(56) References Cited

U.S. PATENT DOCUMENTS

| | | | | |
|---|---|---|---|---|
| 1,552,076 | A * | 9/1925 | Mosier ........................ | 119/72 |
| 3,076,435 | A * | 2/1963 | Seymour .................... | 119/77 |
| 3,205,861 | A | 9/1965 | Moore | |
| 3,441,003 | A * | 4/1969 | Lister et al. .............. | 119/61.53 |
| 3,749,063 | A | 7/1973 | Buffum | |
| D248,448 | S * | 7/1978 | McClure et al. ........... | D24/115 |
| 4,192,256 | A | 3/1980 | Clugston | |
| 4,286,546 | A * | 9/1981 | Moore ..................... | 119/61.54 |
| 4,436,056 | A * | 3/1984 | MacLeod .................... | 119/72 |
| D298,578 | S * | 11/1988 | Swartz et al. .............. | D30/130 |
| 4,990,345 | A * | 2/1991 | Webb ........................ | 426/123 |
| 5,069,167 | A * | 12/1991 | Kasselman ................ | 119/61.53 |
| 5,105,769 | A * | 4/1992 | Smith et al. ................ | 119/61.5 |
| 5,117,778 | A * | 6/1992 | Imamura ................... | 119/51.5 |
| 5,209,184 | A | 5/1993 | Sharkan et al. | |
| 5,277,149 | A * | 1/1994 | East .......................... | 119/51.5 |
| 5,485,806 | A * | 1/1996 | Watanabe ................... | 119/51.5 |
| 5,488,927 | A | 2/1996 | Lorenzana et al. | |
| 5,560,315 | A * | 10/1996 | Lampe ...................... | 119/51.5 |
| 5,632,228 | A * | 5/1997 | Ybarra ...................... | 119/51.5 |
| 5,752,464 | A | 5/1998 | King et al. | |
| 5,809,935 | A * | 9/1998 | Kolterman et al. ........... | 119/74 |
| 5,881,670 | A | 3/1999 | Pelsor | |
| 5,960,741 | A | 10/1999 | Ballen et al. | |
| D419,364 | S * | 1/2000 | Jarvis ......................... | D7/354 |

(Continued)

*Primary Examiner*—Yvonne R. Abbott
(74) *Attorney, Agent, or Firm*—Gold & Rizvi, P.A.; Glenn E. Gold; H. John Rizvi

(57) ABSTRACT

A pet bowl assembly for traveling in a vehicle including a container for holding water, a bowl having a bowl base and a vertical wall projecting upwards from a perimeter of said base, a removably attached container secured to the bottom of the bowl base, and a lid removably attached to the top of the bowl. The container is shaped and sized to dimensionally correspond to a shape and size of a recess of a cup holder in a console of a vehicle. The container is securely retained within the cup holder via the dimensions and an optional adapter. The pet bowl assembly is provided for storing both food and water. The removably attached container is provided for storing pet food, while the bowl and cover are used for storing water. The embodiments optionally include a splashguard for preventing spilling when a pet is drinking from the bowl and when a vehicle is in motion. The adapter incorporates pliant features for compensating for dimensional differences between the container and the cup holder.

18 Claims, 16 Drawing Sheets

U.S. PATENT DOCUMENTS

| | | |
|---|---|---|
| 6,082,301 A | 7/2000 | Kramer |
| 6,101,974 A | 8/2000 | Frolich |
| 6,142,101 A * | 11/2000 | Pelsor .................... 119/61.54 |
| D434,946 S * | 12/2000 | Jarvis ....................... D7/554.4 |
| 6,467,428 B1 * | 10/2002 | Andrisin et al. ............ 119/51.5 |
| 6,478,277 B2 * | 11/2002 | Winquest ............... 248/346.01 |
| 6,644,241 B2 * | 11/2003 | Brown ...................... 119/61.5 |
| 6,718,911 B2 * | 4/2004 | Greenberg ................ 119/51.5 |
| D499,610 S * | 12/2004 | Laib ........................ D7/550.1 |
| 6,912,970 B2 * | 7/2005 | Sage, Jr. ..................... 119/61.5 |
| 6,971,331 B1 * | 12/2005 | Rohrer ........................ 119/77 |
| 7,296,539 B2 * | 11/2007 | Iljas ........................ 119/61.54 |
| 7,387,082 B1 * | 6/2008 | Fried ......................... 119/61.5 |
| D575,007 S * | 8/2008 | Dye, Jr. ..................... D30/123 |
| 2003/0116094 A1 * | 6/2003 | Dlin ............................ 119/61 |
| 2006/0037872 A1 * | 2/2006 | Steiner ....................... 206/216 |
| 2007/0272163 A1 * | 11/2007 | Leary ...................... 119/61.54 |
| 2008/0196668 A1 * | 8/2008 | Clark ........................ 119/51.5 |

* cited by examiner

PET BOWL ASSEMBLY

CROSS-REFERENCE TO RELATED APPLICATION

This Non-Provisional Utility application is a Continuation-In-Part of and claims the benefit of co-pending U.S. Non-Provisional patent application Ser. No. 11/588,541, filed on Oct. 27, 2006, which is incorporated herein in its entirety.

FIELD OF THE INVENTION

The present invention relates to pet accessories, and more particularly, to a pet bowl, including a removable cup holder mount and splashguard to prevent spilling, for use in a vehicle.

BACKGROUND OF THE INVENTION

Many pet owners enjoy bringing their pets along with them when traveling in a vehicle. As a result, it is necessary to provide food and/or water to the animal especially when the animal is left alone in the vehicle on hot days, or when traveling long distances. Typically, water is provided in an open container comprising a circular bowl including a base integrally formed with a wall to form a concave receptacle. Conventional pet dishes generally make it impractical to supply water to a pet when traveling in a vehicle because the water spills from the receptacle when the animal is drinking or when the vehicle is in motion.

In an effort to reduce the annoyances of spilled water, many pet bowls include an anti-spilling feature comprising a lip or liquid guard. Generally, the lip is circumferentially disposed within the perimeter of the bowl to prevent spilling. Although the lip helps to reduce the amount of water spilled in some applications, prior art pet bowls include drawbacks when used for providing water to pets that travel in vehicles.

One drawback is that often times the bowl is placed on a flat planar surface, such as the floor of a vehicle, without proper stabilization. As the driver negotiates the vehicle on the road, the motion of the vehicle tends to shift or move the bowl along the floor of the vehicle resulting in spilled water. Still another drawback of conventional pet bowls is that the bowl is used for water or food but generally not both. Because the proper care of a pet may require the supply of both water and food, especially when traveling long distances, the owner must provide two separate containers thereby increasing the burden on the owner, and further utilizing more space in the vehicle.

Another drawback is that prior art pet bowls are typically bulky, large in size, heavy and not easily portable. The bowls are difficult or awkward to carry making it cumbersome to transport and use. Pet bowls for use in a vehicle further require fasteners, straps, hooks, or the like for securely attaching the bowl to a window, door, seat, armrest or other structure making it cumbersome for a user to install in a vehicle.

Accordingly, there remains in the art a need for a pet bowl for providing water and/or food to pets that travel in a vehicle where the bowl is inexpensive, lightweight, and optionally includes an anti-spilling feature for preventing the spilling of water from the bowl. There is also a need for a pet bowl that is portable, compact, can be used to provide both food and water, and is securely stabilized within a vehicle when the vehicle is in motion.

SUMMARY OF THE INVENTION

The present invention overcomes the deficiencies of the known art and the problems that remain unsolved by providing a pet bowl assembly for use in a vehicle where the pet bowl assembly is portable, gives rise to manufacturing economy, and is easy to maintain and use. Moreover, the overall construction of the pet bowl assembly provides an inwardly extending splashguard or lip that dampens or prevents water and/or food from spilling, and enables the bowl to be securely stabilized within the vehicle when a pet is drinking from the bowl or when a vehicle is in motion.

In accordance with one embodiment of the present invention, there is provided a pet bowl assembly comprising a container including a base and sidewall defining a container receptacle for holding food or water, a triangular shaped bowl including a first wall, a second wall and a third wall, where the walls define a bowl receptacle that is in fluid communication with the container receptacle. The pet bowl assembly further includes a lid that is removably attached to the triangular shaped bowl sealing the food or water within the bowl receptacle.

Advantageously, the container includes a shape and size that dimensionally corresponds to a shape and size of a recess of a cup holder in a console of a vehicle so that the container is securely retained within the recess of the cup holder. The container, and triangular shaped bowl are dimensionally configured to provide a selected storage capacity, and are integrally molded as one piece. Alternatively, the bowl can be provided in any reasonable shape conducive to the application of the present invention.

In one aspect, the pet bowl assembly includes a splashguard that is either integrated along an interior perimeter adjacent the upper inner edge of the bowl receptacle or separately secured within the bowl receptacle for preventing food or water from spilling.

A bowl lid is provided in the same peripheral shape as the bowl, the lid being removably attached to the shaped bowl by any one of a snap-on feature, a living hinge, a magnet, a clip, a rotating post, a hook and loop, sliding rails, threads, or pressure detents.

In accordance with an alternative embodiment of the present invention, there is provided a pet bowl assembly comprising a container including a container receptacle for holding pet food, and an upper portion having threads. The pet bowl assembly further includes a triangular (or other) shaped bowl having a bowl receptacle for storing water where the bowl includes a threaded recess (a coupling interface) formed within the base of the bowl for detachably receiving the upper portion of the container thereby sealing the pet food within the container receptacle. The coupling interface can be provided within the base of the bowl or extending there from. A leveling feature can be provided extending from the base of the bowl supporting the bowl at a level orientation for compensation of the extended coupling interface.

In yet another embodiment of the present invention there is provided a pet bowl assembly for use in a vehicle, the pet bowl assembly comprising a container including a container receptacle for holding pet food or water, a triangular shaped bowl including a first wall, a second wall, a third wall, and a base, where the base and walls define a triangular bowl receptacle for holding water, and a lid removably attached to the triangular shaped bowl for sealing the water within the bowl receptacle.

Preferably, the container includes a shape and size that dimensionally corresponds to a shape and size of a recess of a cup holder that is included in any one of a console of a vehicle including a boat, truck, van, transport, airplane, camper, RV, bus, train, ATV, or table, chair, dog house, kennel, or any other mode or device that includes a cup holder for securely holding a cup therein.

Preferably, the container and the bowl are either integrally molded as one piece orienting the container receptacle to be in fluid communication with the bowl receptacle, or the container is separately attached to the bowl having a means for detachably receiving formed therein for releasably attaching the container to the bowl. The means for detachably engaging may include any one of threads, a bayonet connection, a snap-on feature, a slide means, magnets, and pressure detents.

Another aspect of the present invention provides an adapting sleeve, which compensates for a variety of cup holder designs and dimensions, via a plurality of flexible adapter winglets.

Yet another aspect provides a cover configuration having two components. The first (splash) component incorporates a coupling interface about an outer perimeter, a bowl access opening located through a center portion, a second (seal) component interface disposed about the perimeter of the bowl access opening, and a splashguard projecting downward into the bowl portion. The second component is removably secured to the first component via the second component interface, providing a fluid sealing cover.

Regarding the embodiments described herein, as well as those covered by the claims, the pet bowl assembly is loaded with food and/or water and a lid is removably attached to the pet bowl. The pet bowl assembly is securely inserted within the recess of the cup holder of a vehicle console allowing the triangular shaped bowl to extend partially between two front seats of a vehicle. The lid may be opaque or transparent for allowing a user to view the contents stored within the pet bowl. Further, the lid may include an extending grasp for assisting a user in removing the lid from the pet bowl. The container, pet bowl, lid and splashguard may be constructed from glass, ceramic, metal, tin, a rigid or resilient material, a light-weight synthetic material or a polymeric material including plastic, rubber, urethane or neoprene material, or any combination thereof.

DETAILED DESCRIPTION OF THE PREFERRED EMBODIMENTS

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention.

Figure 1:
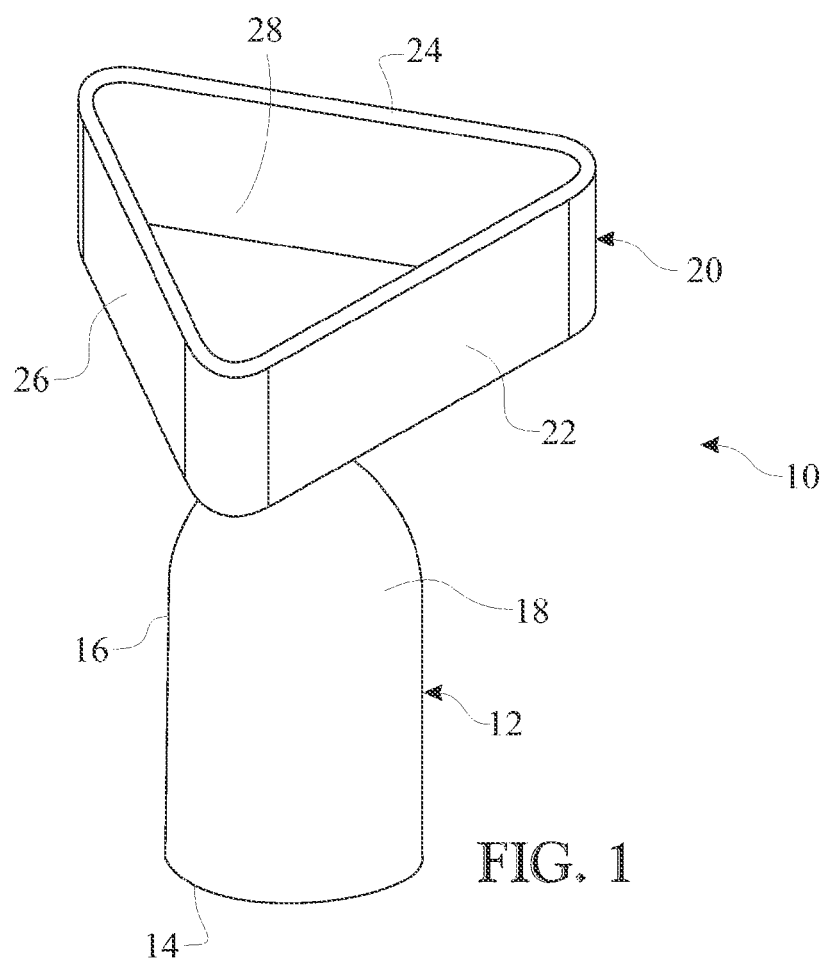
FIG. 1 is a perspective view of an embodiment of a pet bowl assembly, according to the present invention.

Referring now to the drawings wherein like elements are represented by like numerals throughout, there is shown in FIG. 1 a perspective view of a pet bowl assembly 10, according to one embodiment of the present invention. The pet bowl assembly 10 includes a container 12 comprising a base 14 integral with an upwardly extending sidewall 16 that define a container receptacle 18 for holding pet food or water. In one non-limiting example, sidewall 16 comprises a cylindrical wall that circumferentially extends from the base 14 to form a circular container 12.

Figure 5:
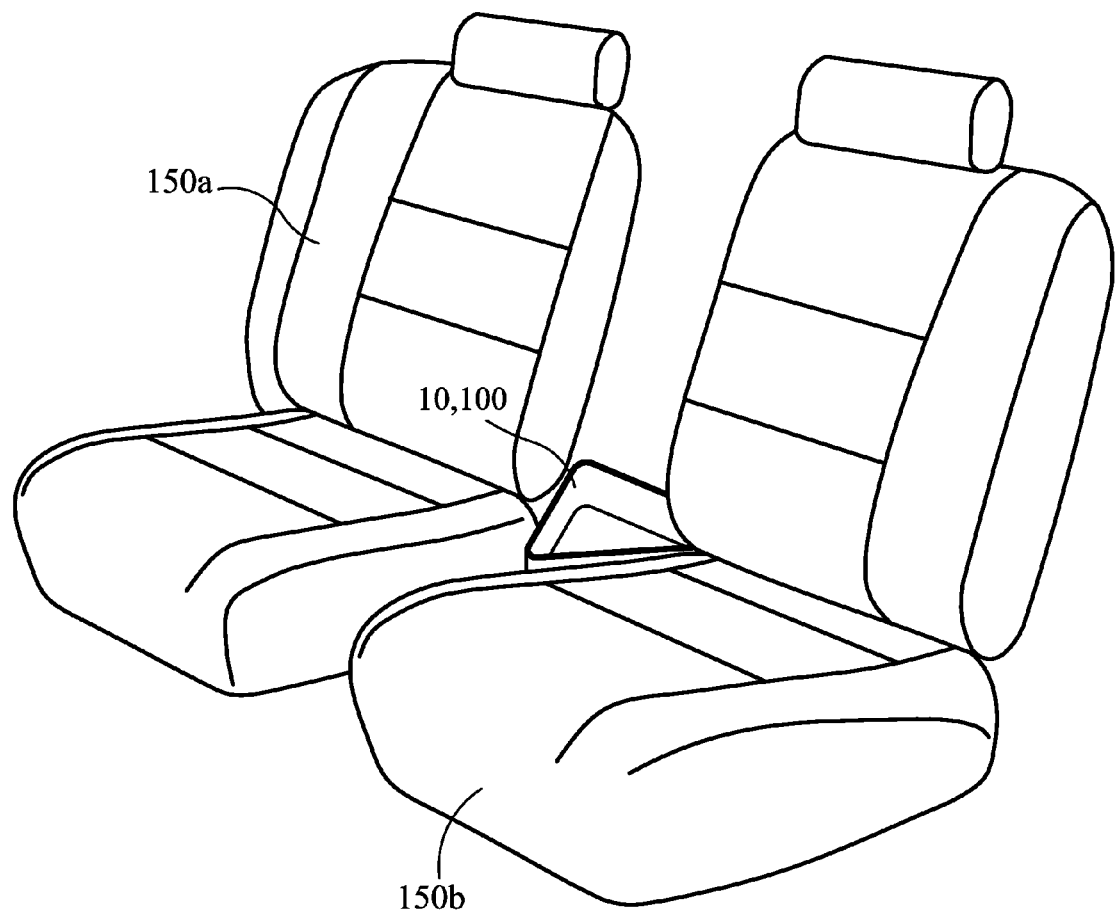
FIG. 5 is a perspective view of a pet bowl assembly removably inserted within a center console of a vehicle.

The pet bowl assembly 10 further includes a bowl 20. The bowl 20 includes a first wall 22, a second wall 24 and a third wall 26 that integrally form a bowl receptacle 28 for holding food or water. As seen in FIG. 1, the walls 22, 24, and 26 form a triangular-shaped bowl 20 to ensure that the pet bowl assembly 10 can be secured between two adjacent front seats 150a, 150b of a vehicle, as illustrated in FIG. 5. The height and diameter of container 12, and the height of walls 22, 24, and 26 of bowl 20 are dimensionally configured to provide a container receptacle 18, and bowl receptacle 28 having a desired storage capacity for holding a larger or smaller quantity of food or water.

Figure 2:
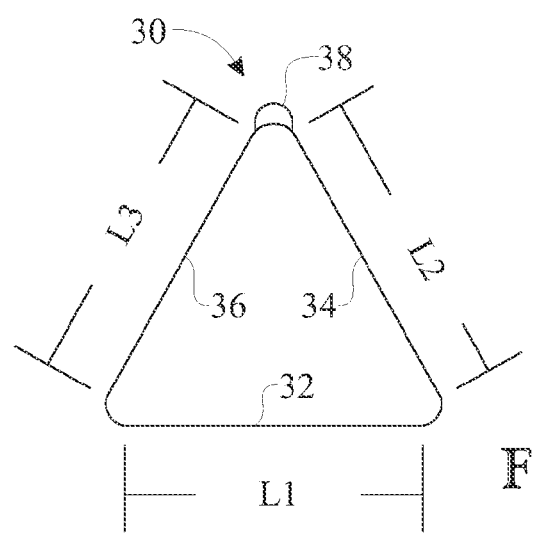
FIG. 2 is a top view of a lid for removably attaching to the pet bowl, according to the present invention.

Turning to FIG. 2, there is shown a top view of a lid 30 for removable attachment to bowl 20 for covering the contents stored within the bowl receptacle 28. Lid 30 includes a first lid side 32, a second lid side 34 and a third lid side 36 that are integrally associated to form a triangular shaped lid 30. The triangular shaped lid 30 is removably attached to the pet bowl 20 using a snap-on feature, a living hinge, a rotating post, clasp, hook and loop, sliding rails, a magnetic element, threads, or any other suitable lid securing means for easily and quickly removing and attaching the lid 30 to the pet bowl 20.

In one exemplary embodiment, lid 30 includes a first lid side comprising a length L1 of 5 inches, a second lid side 34 comprising a length L2 of 6 inches, and a third lid side 36 comprising a length L3 of 6 inches. It will be understood that lid 30 may comprise other lengths L1, L2 and L3 that are adapted to conform to the triangular shape of pet bowl 20 for properly covering the opening of bowl receptacle 28. Lid 30 may be opaque or transparent for allowing a user to view the contents stored within the pet bowl 20. Lid 30 may further include an extending grasping tab 38 that is integrally formed along the outer edge of the lid 30 for easily grasping and removing the lid 30 from the pet bowl 20.

Figure 3:
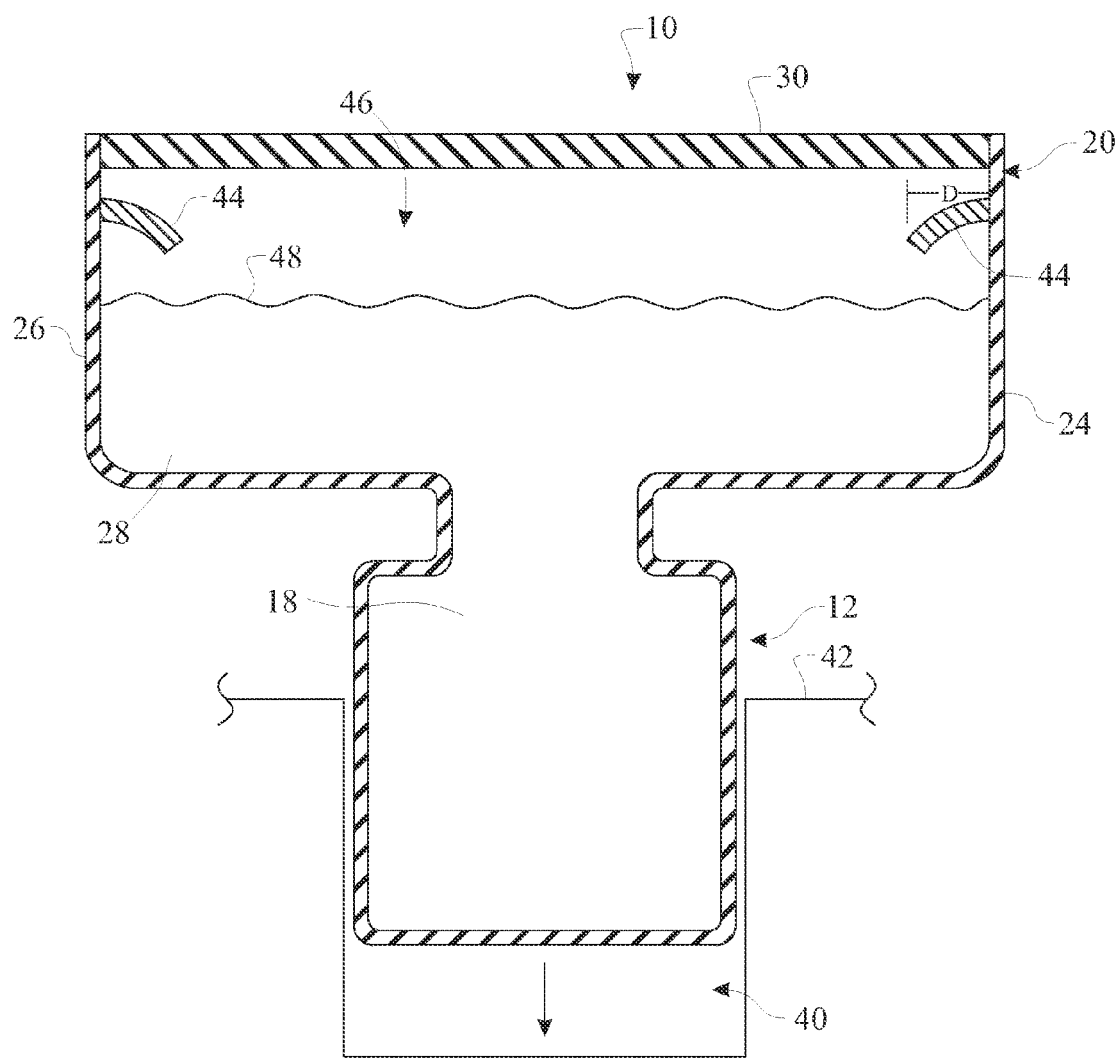
FIG. 3 is a front cross-sectional view of the pet bowl assembly, according to one embodiment of the present invention.

Referring now to FIG. 3, there is shown a front cross-section view of the pet bowl assembly 10, according to one embodiment of the present invention. As shown, pet bowl 20 is integrated with container 12 so that the bowl receptacle 28 is in fluid communication with the container receptacle 18. Both the container 12 and bowl 20 may be integrally formed as one-piece or separately attached together. The container 12 is shaped and sized to correspond with the shape and size of recess 40 of a cup holder 42 formed in a center console 148 of a vehicle.

In one alternative embodiment, the pet bowl assembly 10 may further comprise a liquid splashguard or lip 44 that is integrated along the interior perimeter, and adjacent the upper rim or edge of bowl 20. The lip 44 impedes the natural spilling of water 48 that occurs when an animal is drinking or when a vehicle is in motion. As shown in FIG. 3, lip 44 extends inwardly within the bowl receptacle 28 a distance D while providing an access opening 46. The access opening 46 is selected to accommodate a variety of different sized animals to enable the animal to easily access the water 48 within the bowl 20.

In another exemplary embodiment, lip 44 may comprise a separate triangular shaped element that is removably attached within the inner perimeter, and upper edge of bowl 20 to extend inwardly a distance D within the bowl receptacle 28. In one non-limiting example, lip 44 may snap into a recess along the inner perimeter of the bowl receptacle 28 or attach to the upper ridge of the bowl 20. In this configuration, lip 44 may be easily removed to facilitate washing the pet bowl assembly 10.

Prior to traveling with an animal, water is disposed within the container receptacle 18. As a result of both receptacles 18, 28 being in fluid communication with each other, the water 48 extends upwards within the bowl receptacle 28. The container 12 and bowl 20 are filled so that the surface of the water 48 extends below lip 44 to prevent spilling. The lid 30 is removably attached to bowl 20 sealably covering the water 48 stored within the bowl receptacle 28. A user may grasp the container 12 with one hand, and easily transport the pet bowl assembly 10 to a vehicle. The container 12 is disposed within recess 40 of the cup holder 42 of console 148 to securely stabilize the pet bowl assembly 10 in place.

Figure 4:
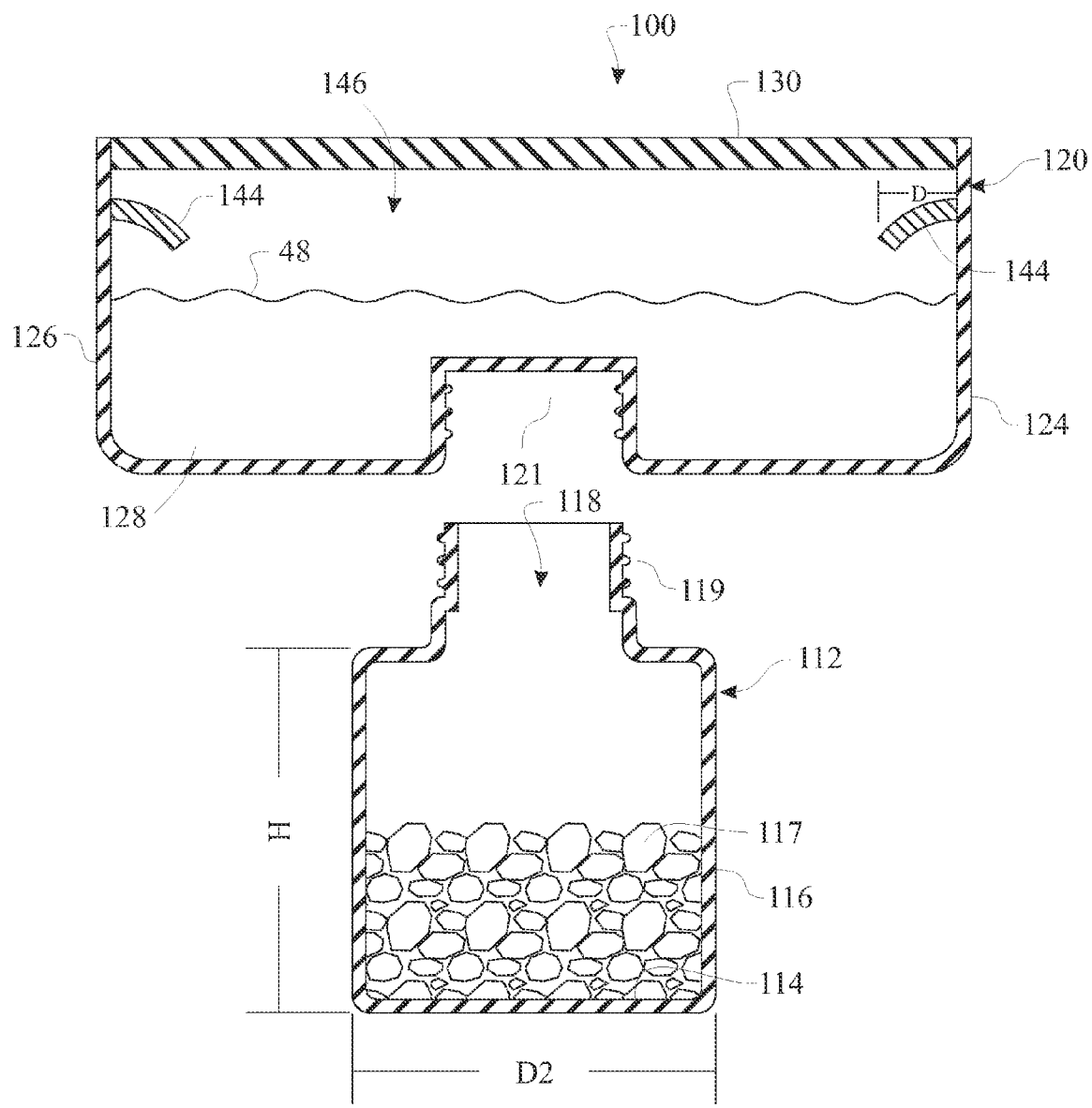
FIG. 4 is a front cross-sectional view of a pet bowl assembly, according to another embodiment of the present invention.

Turning now to FIG. 4, there is shown a front cross-sectional view of a pet bowl assembly 100, according to an alternative embodiment of the present invention. The pet bowl assembly 100 includes a circular container 112 comprising a base 114 that is integrally associated with a cylindrical sidewall 116 defining a container receptacle 118 for holding pet food or treats 117. In one exemplary embodiment, the circular container 112 includes a diameter D2 comprising 2.5 inches, and a height H also comprising 2.5 inches. It will be understood that the diameter D2 of container 112 is selected to conform to the diameter of recess 40 of cup holder 42, as illustrated earlier in FIG. 3. Container 112 further includes an upper portion 119 having threads for threadably engaging the container 112 within a bowl recess 121 that is formed within a pet bowl 120.

The pet bowl assembly 100 further includes a bowl 120. The pet bowl 120 includes a first wall 122 (not shown), a second wall 124 and a third wall 126 that integrally form a triangular shaped bowl receptacle 128 for holding water 48. The pet bowl 120 is advantageously configured as a triangular shaped bowl 120 for being securely disposed between two adjacent front seats 150a, 150b, of a vehicle, as illustrated in FIG. 5.

It will be noted that the combinational dimensions of the height H, and diameter D2 of container 12, 112, and the height of walls 22, 24, 26, 122, 124 and 126 are configured to provide a desired storage capacity of container receptacles 18, 118, and bowl receptacles 28, 128. The container 12, 112, bowl 20, 120, or both, may be configured for holding and storing larger or smaller quantities of food 117 and/or water 48 thus reducing the need for constant replenishment.

As shown in FIG. 4, the bowl further includes a threaded recess 121 that is formed within the base of bowl 120 for threadably receiving the upper portion 119 of container 112. Preferably, threaded recess 121 is formed in the center of the bottom surface of bowl 120, and shaped and sized to correspond to the shape and size of the upper portion 119 of container 112. It will be understood that the container 112 may be releasably attached to the bowl 120 using any suitable means for detachably engaging including but not limited to a snap-on feature, a bayonet connection, spring clips, detents or the like.

The pet bowl assembly 100 further includes a triangular shaped lid 130, as illustrated in FIG. 2. The lid 130 is shaped and sized to correspond to the shape and size of the triangular pet bowl 120. The lid 130 is removably attached to the pet bowl 120 for covering the bowl receptacle 128 and contents therein.

The pet bowl assembly 100 may further comprise a liquid splashguard or lip 144 that is integrated along the interior perimeter, and adjacent the upper rim or edge of bowl 120. The lip 144 prevents the natural spilling of water that occurs when an animal is drinking, when a vehicle is in motion and both. The lip 144 extends inwardly within the bowl receptacle 128 a distance D defining an access opening 146 for enabling a pet to gain access to the water 48. The access opening 146 is sized for accommodating different sized animals without restricting access to the water 48 within the bowl 120.

It will be noted that containers 12, 112, bowls 20, 120, lids 30, 130, and lips 44, 144 may be made from a durable rigid or resilient material including any one of glass, metal, tin, ceramic, a light-weight synthetic material or a polymeric material including plastic, rubber, urethane or neoprene material, or any combination thereof. In addition, as will be recognized by one of ordinary skill in the art, the described embodiments are adaptable to a variety of different dimensions with the preferred use and purpose of the pet bowl assembly 10, 100 being securely held within the recess 40 of a cup holder 42 of a center console 148 of a vehicle.

In preparation for traveling with a pet, pet food 117 is disposed within container receptacle 118 of container 112. Container 112 is releasably attached to the pet bowl 120 by threadably engaging the upper portion 119 of container 112 within the threaded recess 121. Bowl receptacle 128 of bowl 120 is subsequently filled with water 48 so that the water level extends below lip 144 or splashguard to prevent spilling. The lid 130 is removably attached to pet bowl 120 sealing the water 48 within bowl receptacle 128. The pet bowl assembly 100 is easily transported to a vehicle where the container 112 is disposed within the recess 40 of cup holder 42 of console 148.

As illustrated in FIG. 5, the triangular shape of the pet bowl 20, 120 aids in ensuring that the pet bowl assembly 10, 100 is snugly secured between two adjacent front seats 150a, 150b of the vehicle further enhancing to stabilize the pet bowl assembly 10, 100 when a pet is drinking from the bowl 20, 120 or when the vehicle is in motion. With the container 12, 112 secured in recess 40 of cup holder 42, the user can easily remove the lid 30, 130 from the pet bowl 20, 120 to enable a pet to drink from the bowl 20, 120, through access opening 46, 146, respectively.

Although the described embodiments are directed for use in a vehicle, it should be emphasized that the embodiments may also be used in other applications such as a boat, truck, van, transport, table, airplane, chair, camper, RV, bus, train, ATV, dog house, kennel, or any other mode or device that includes a recess 40 of a cup holder 42 for securely holding a cup, beverage, container, or the like.

The pet bowl assembly 10, 100 of the present invention offers the advantages of a pet bowl assembly 10, 100 that is compact, and securely stabilized within a vehicle. The overall construction of the pet bowl assembly 10, 100 provides an inwardly extending splashguard or lip 44, 144 that dampens or prevents water 48 and/or food from spilling when a pet is drinking or when a vehicle is in motion.

Figure 6:
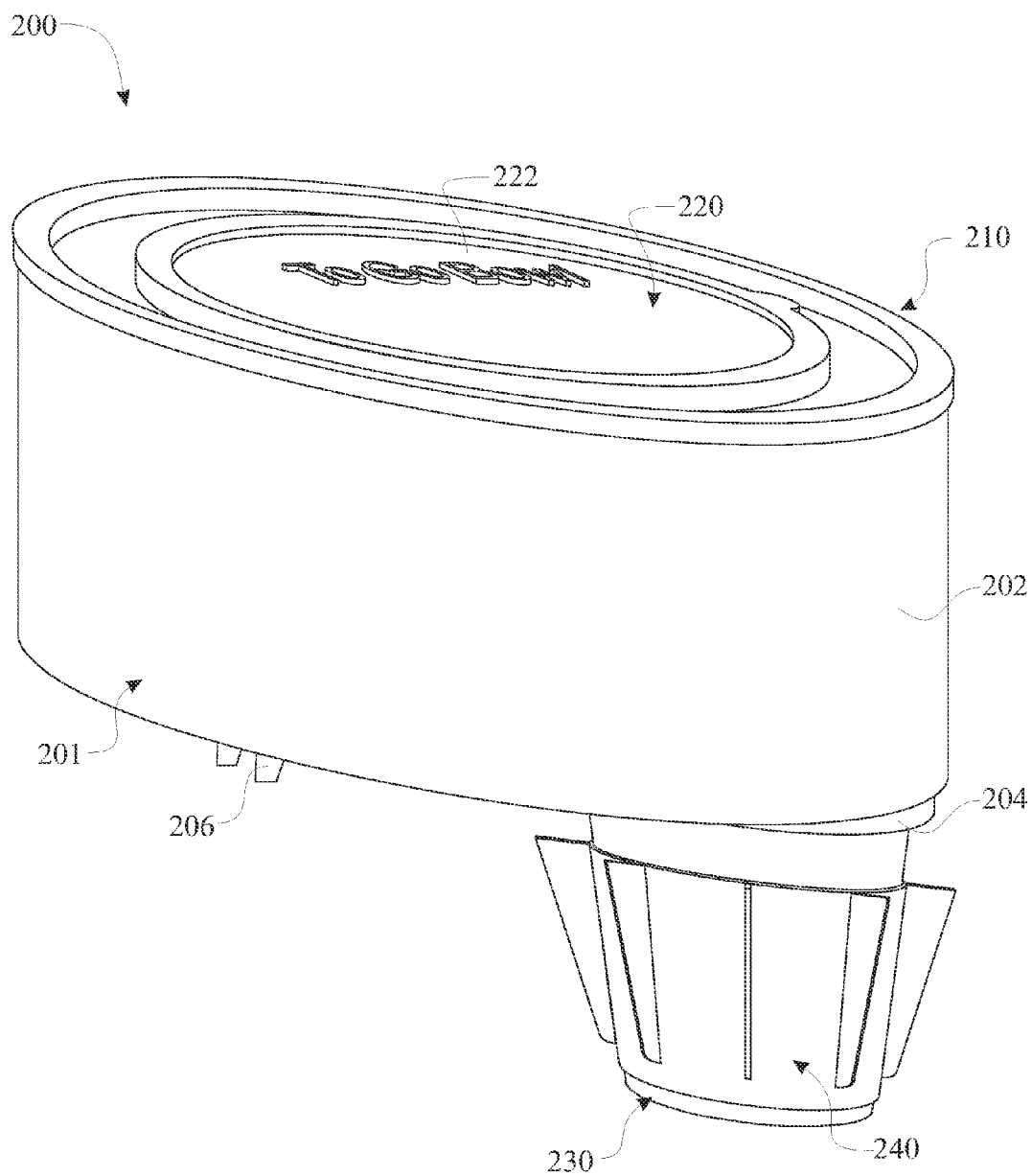
FIG. 6 is a perspective view of an alternate pet bowl assembly.
Figure 7:
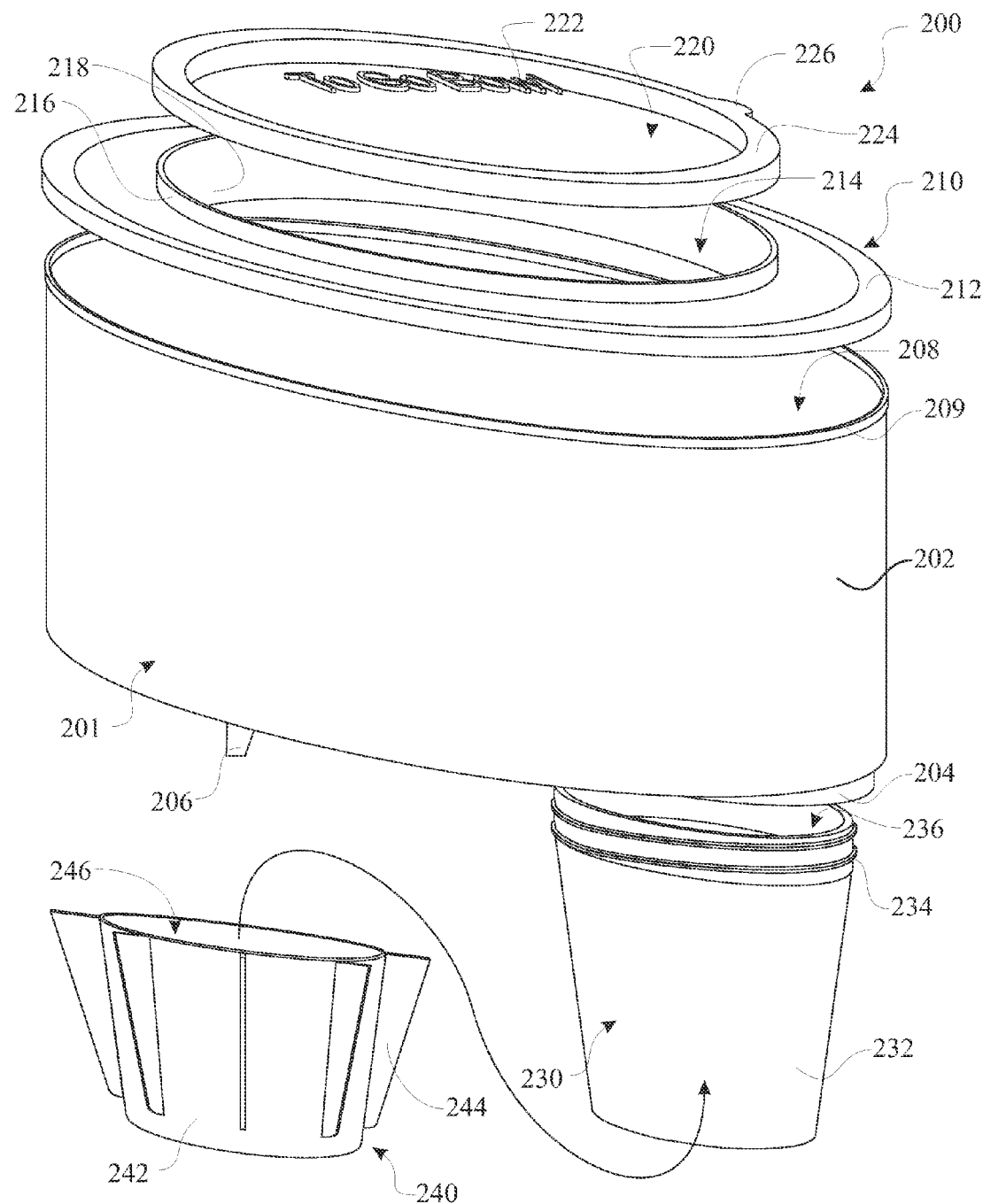
FIG. 7 is a perspective exploded assembly view of the pet bowl assembly presented in FIG. 6.
Figure 8:
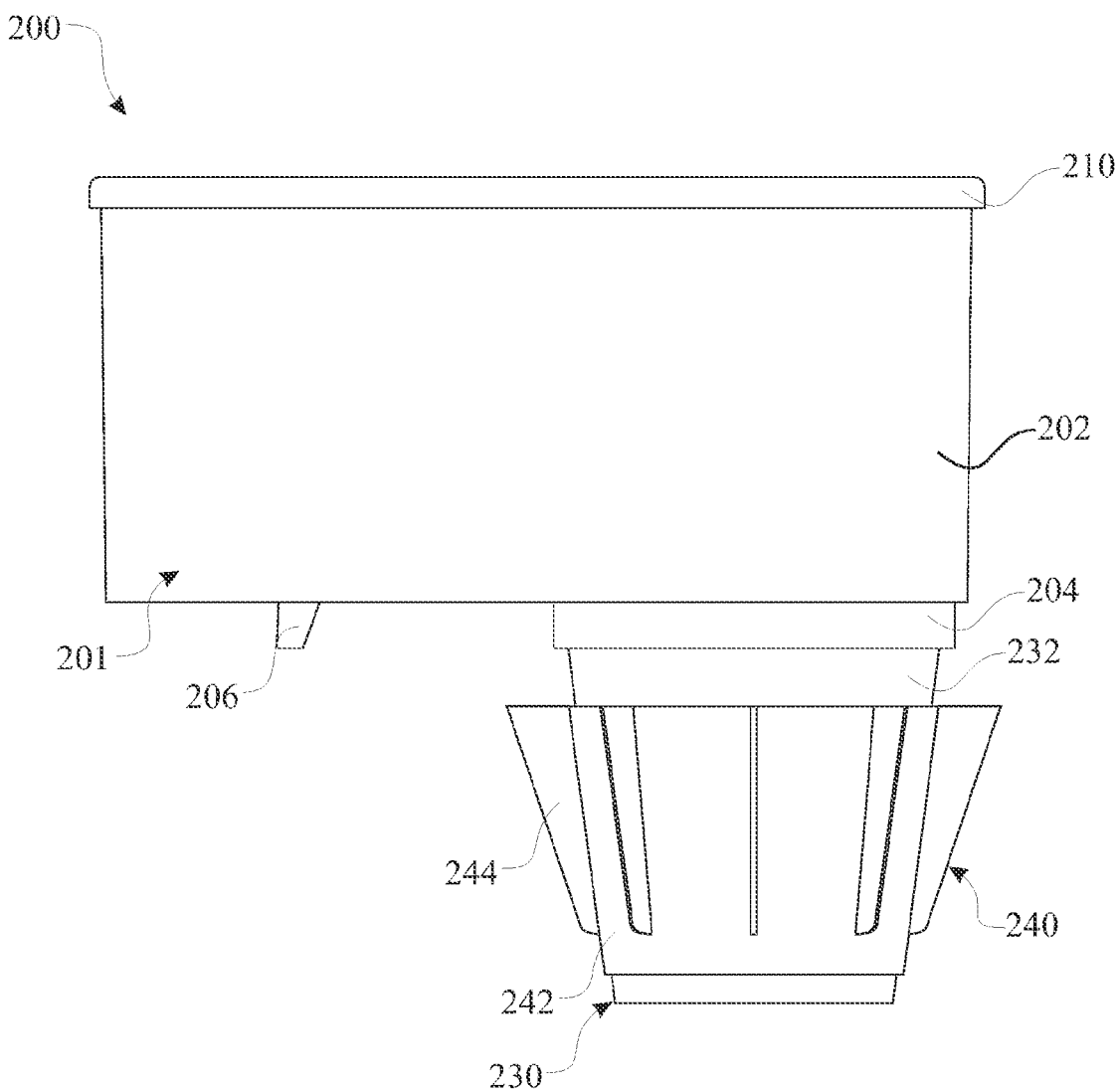
FIG. 8 is a side elevation view of the pet bowl assembly presented in FIG. 6.
Figure 9:
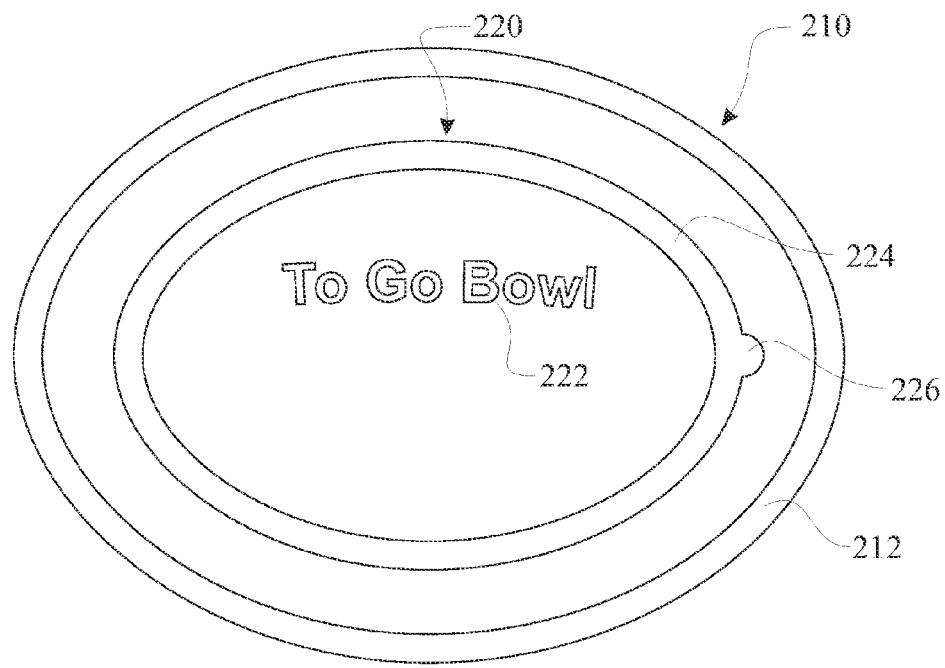
FIG. 9 is a top view of the pet bowl assembly presented in FIG. 6.
Figure 10:
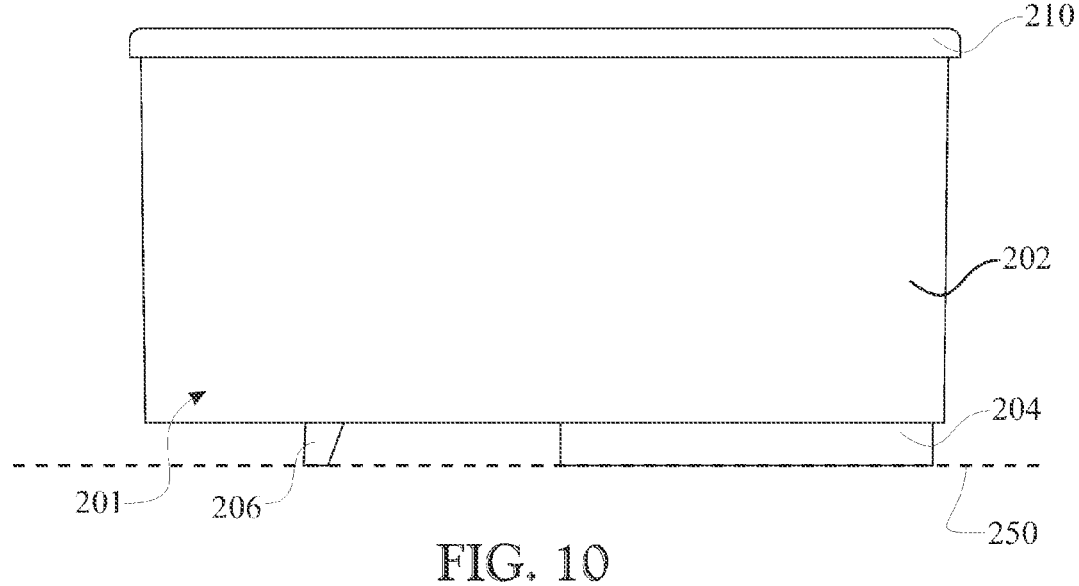
FIG. 10 is a side elevation view of the pet bowl assembly presented in FIG. 6, the illustration presenting the utilization of the leveling feature.
Figure 11:
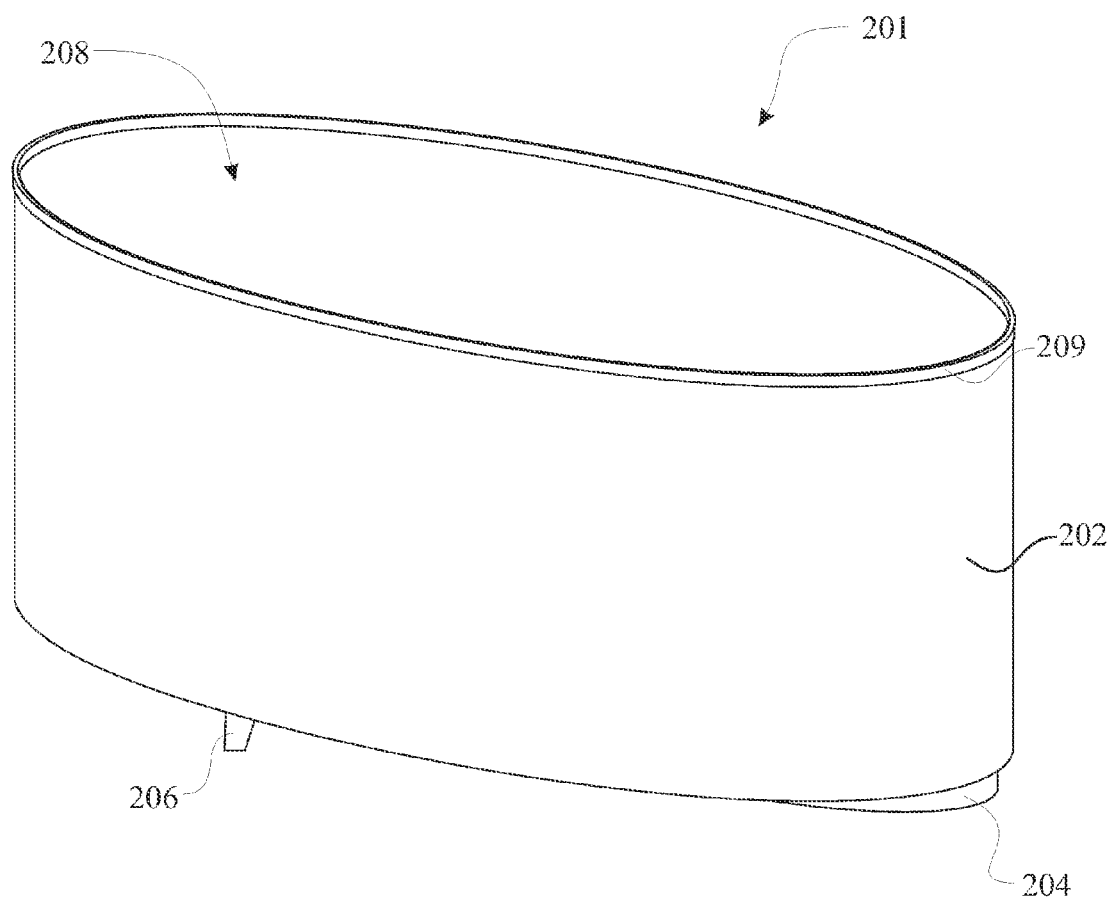
FIG. 11 is a perspective view of a pet bowl body.
Figure 12:
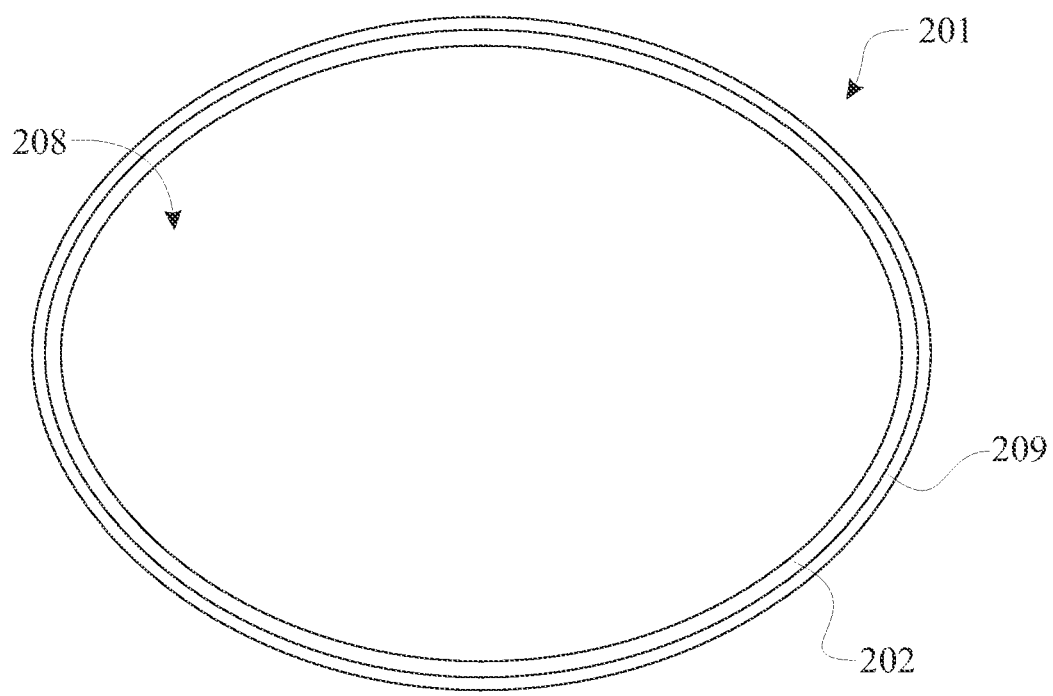
FIG. 12 is a top planar view of the pet bowl body of FIG. 11.
Figure 13:
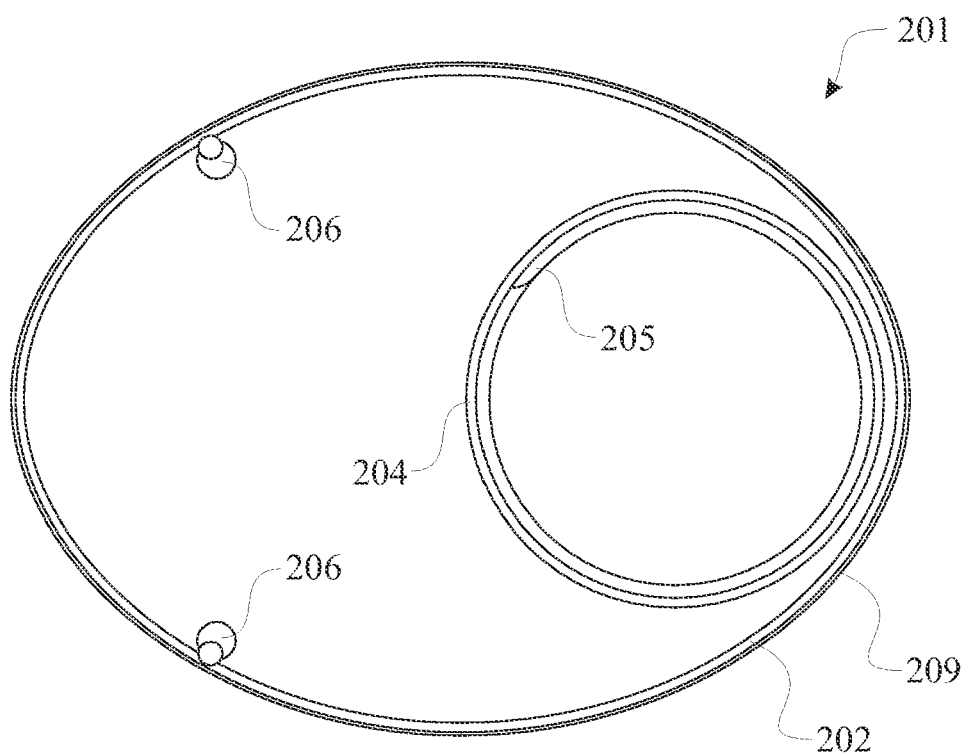
FIG. 13 is a bottom planar view of the pet bowl body of FIG. 11.
Figure 14:
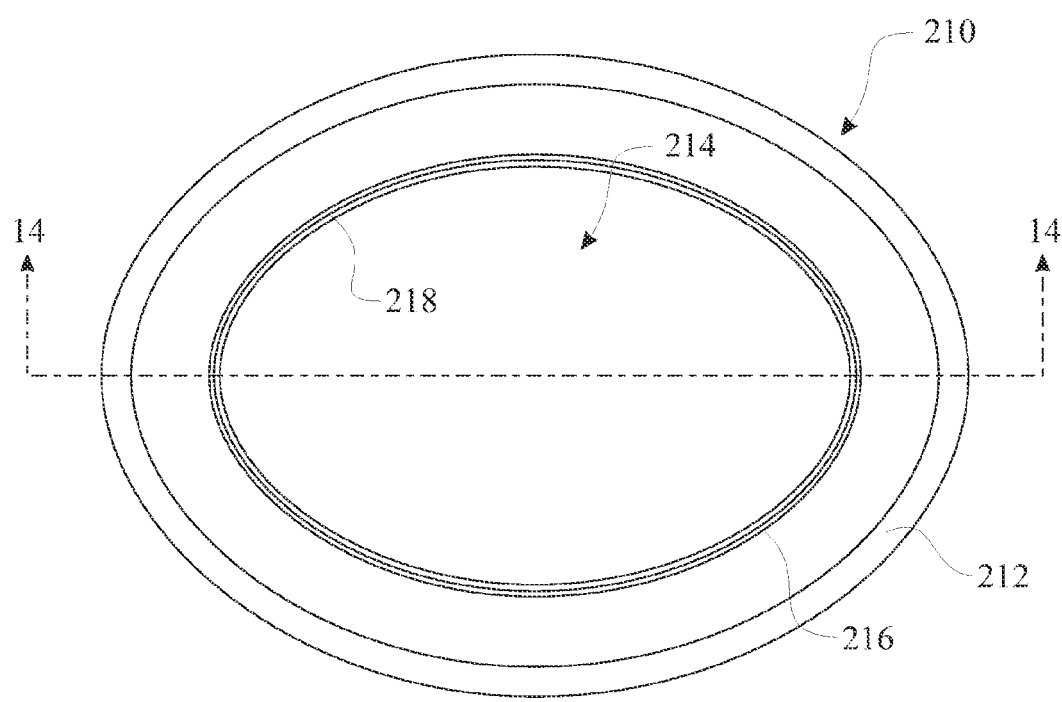
FIG. 14 is a top planar view of a splashguard cover component.
Figure 15:
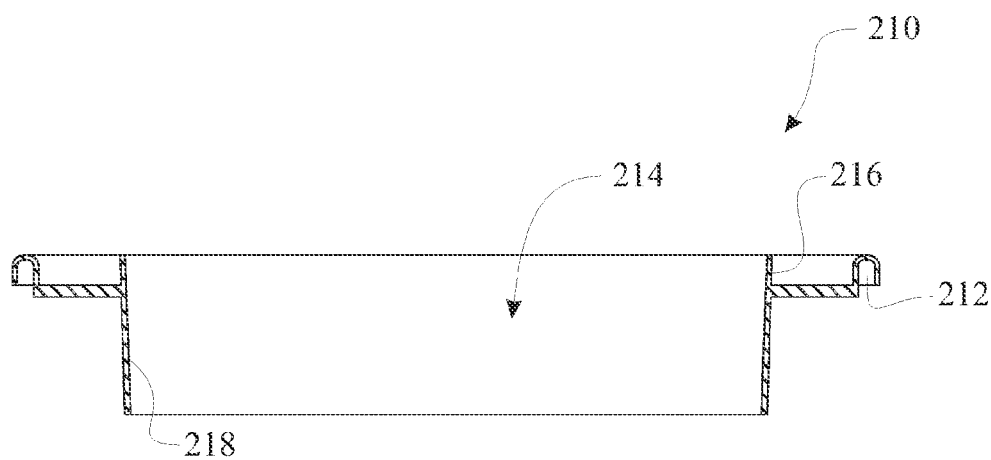
FIG. 15 is a side sectional view of the splashguard cover component taken along section line 14-14 of FIG. 14.
Figure 16:
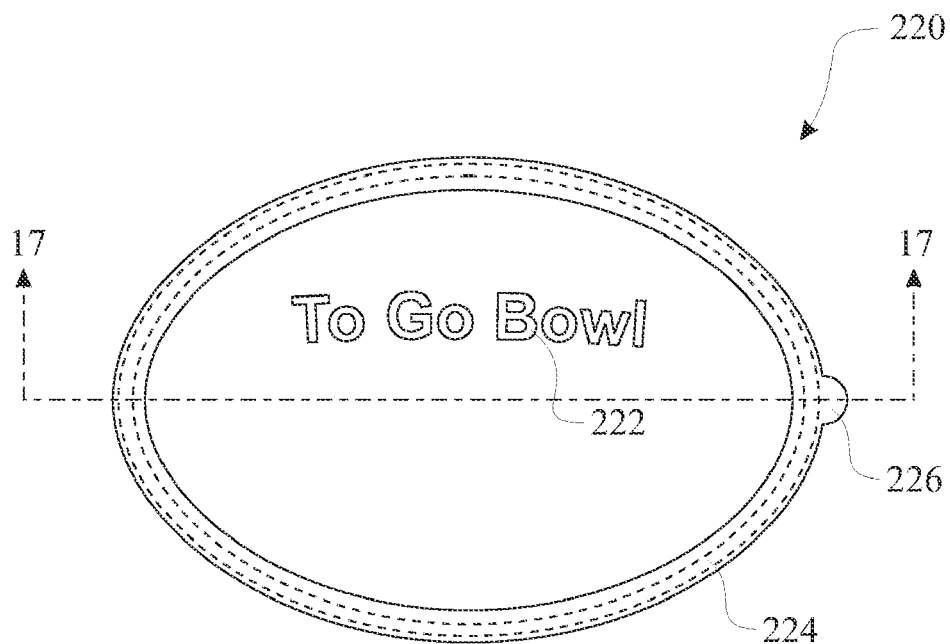
FIG. 16 is a top planar view of a cover component.
Figure 17:
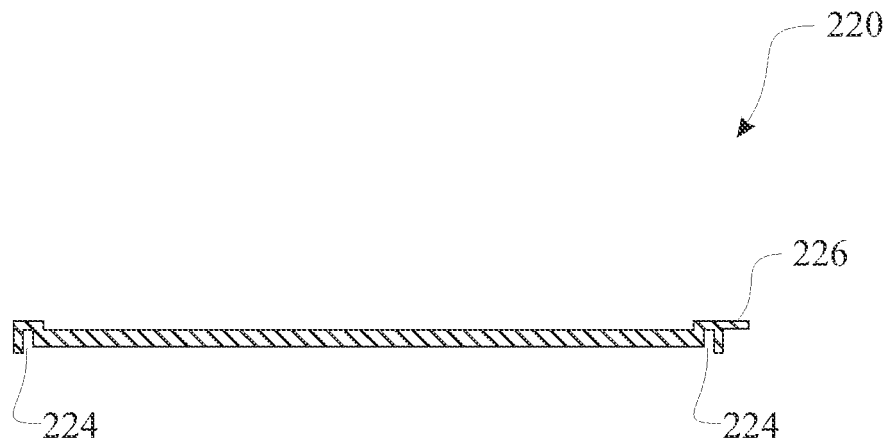
FIG. 17 is a side sectional view of the cover component taken along section line 17-17 of FIG. 16.
Figure 18:
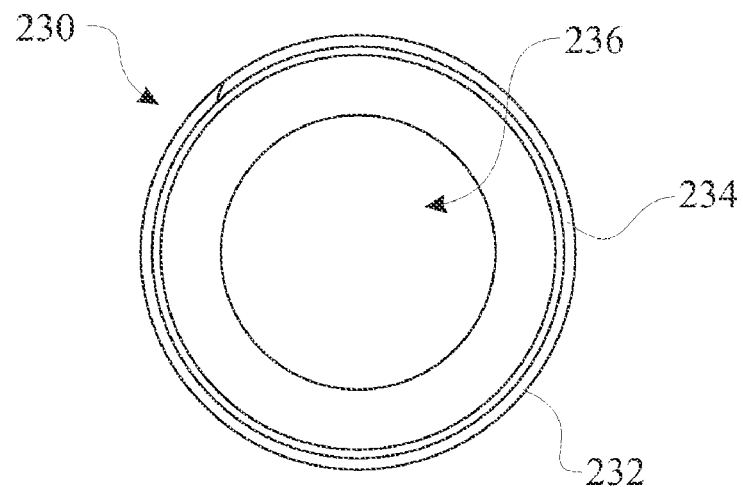
FIG. 18 is a top planar view of a mount component.
Figure 19:
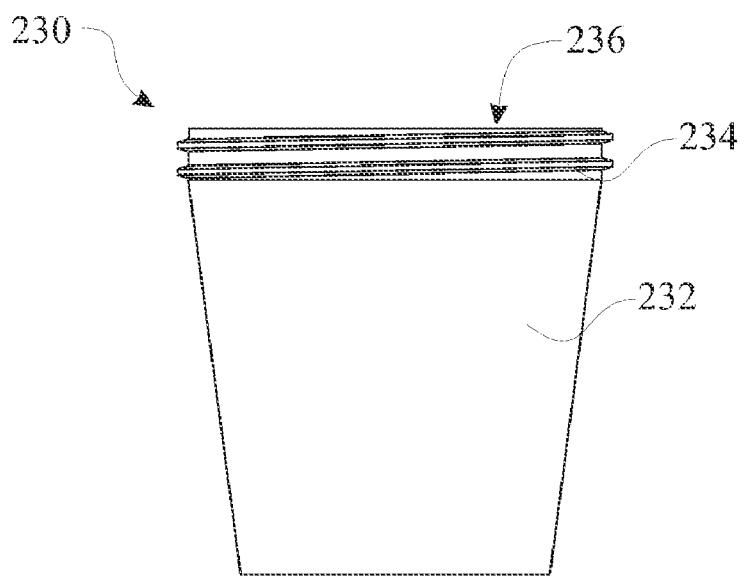
FIG. 19 is an elevation view of the mount component of FIG. 18.
Figure 20:
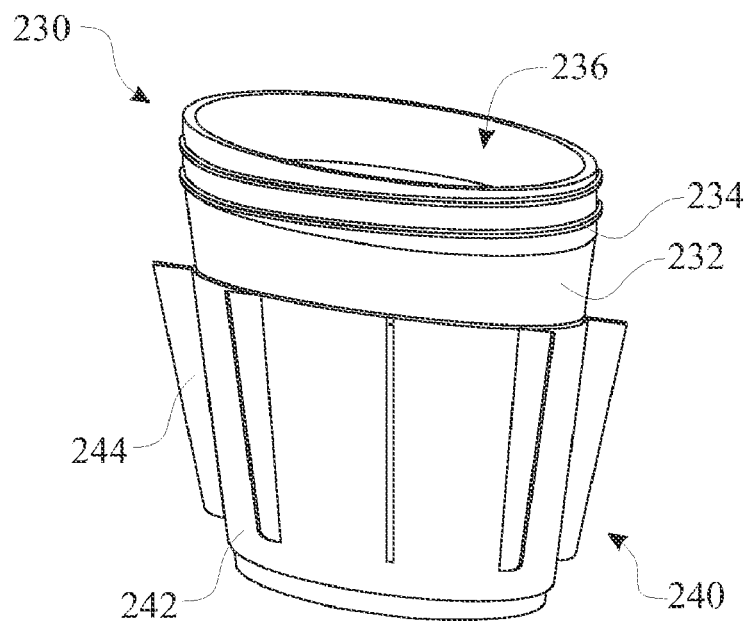
FIG. 20 is a perspective view of a cup holder adapter assembled to the mount component of FIG. 18.
Figure 21:
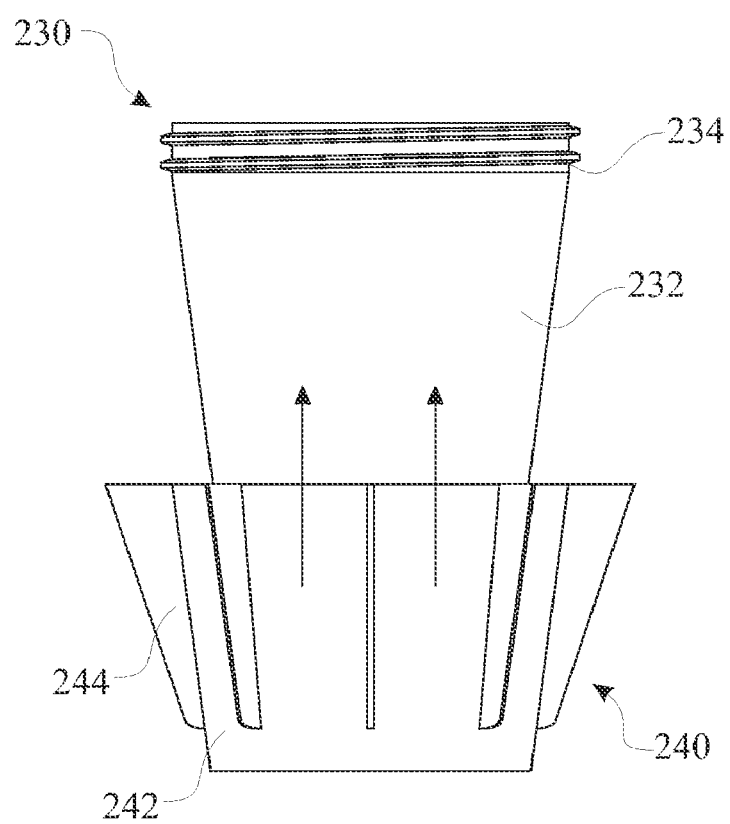
FIG. 21 is an elevation assembly view, illustrating the assembly of the cup holder adapter to the mount component.
Figure 22:
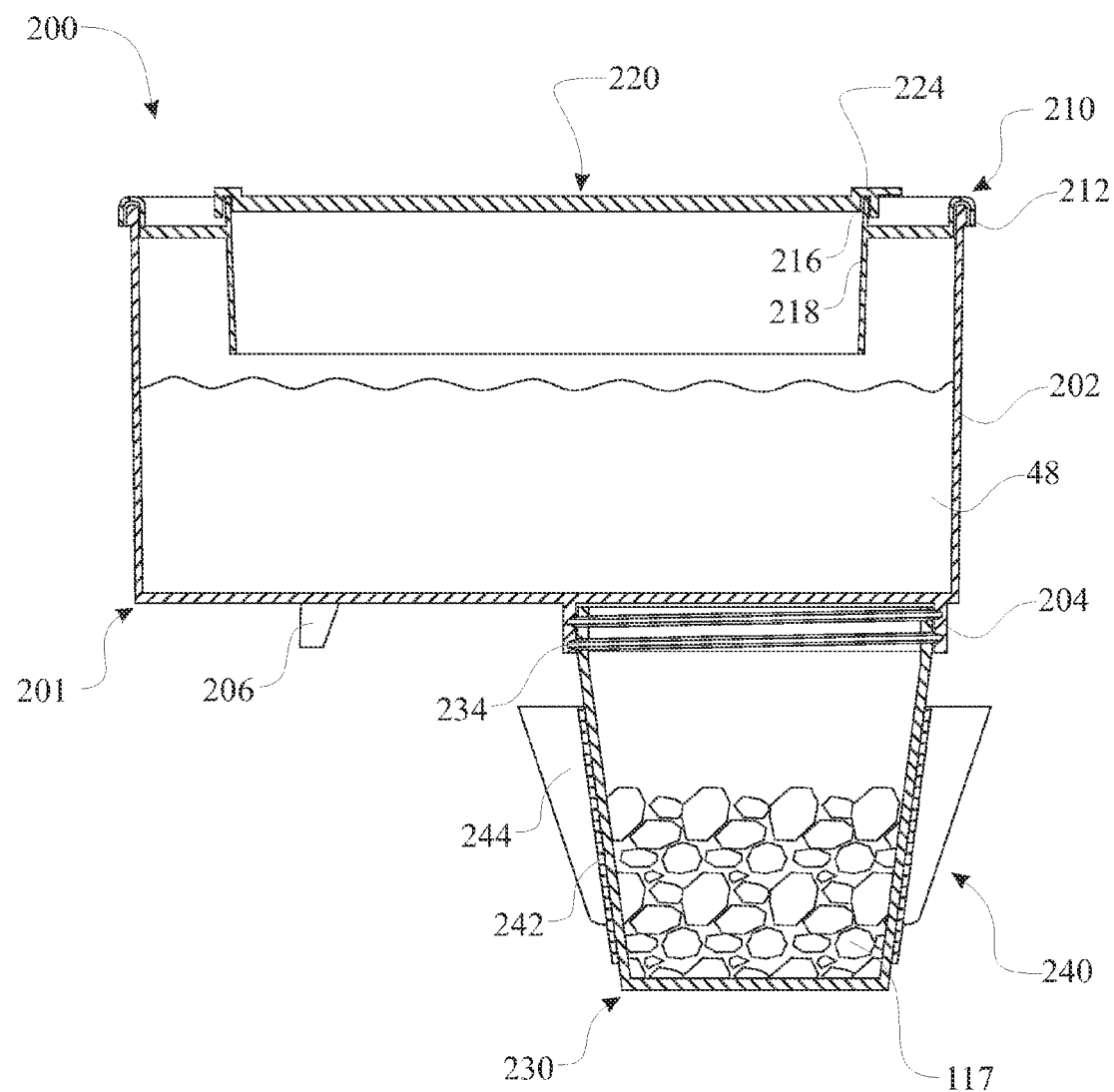
FIG. 22 is a side sectional view of the pet bowl assembly of FIG. 6, taken along the center line of the assembly.

An alternate embodiment is presented in FIGS. 6 through 22. The figures illustrate the individual components as well as the completed assembly in various configurations. Shown in FIG. 6 is a perspective view of a pet bowl assembly 200, according to an alternate embodiment of the present invention. The pet bowl assembly 200 includes a bowl 201. The bowl 201 includes a bottom face with a contiguous and upwardly extending sidewall that defines a bowl body 202, forming a containing portion 208 for holding water 48 or pet food or treats 117. The alternate embodiment provides the bowl 201 having an oval shape. A mount receptacle 204 is integrated into the bottom face of the bowl 201. A leveling feature 206 is disposed upon the bottom face providing a level support when placed onto a resting surface 250 (FIG. 10). This allows the user to remove the pet bowl assembly 200 from the vehicle, and with a mount container 230 removed, place the bowl 201 onto the ground, using the bowl 201 as a water or food bowl for the pet. A snap latch ring 209 is disposed about an upper perimeter of the bowl body 202 providing a means for removably securing a splashguard cover portion 210.

The mount container 230 is removably coupled to the bowl 201 via a detachably engaging interface provided between a base mount coupling threads 205 of the mount receptacle 204 and a mount securing threads 234 of the mount container 230. Although threading is illustrated, the interface can actually be of any detachably engaging arrangement, which may include any one of: threads, a bayonet connection, a snap-on feature, a slide means, magnets or pressure detents. A cup holder adapter sleeve 240 can optionally be assembled about an exterior of a mount container body 232 of the mount container 230 by sliding the mount container body 232 through an adapter sleeve opening 246 of the cup holder adapter sleeve 240. The mount container body 232 becomes sealed when engaged with the mount receptacle 204, providing an object storage container 236 as a means for storing items such as pet food or treats 117. The mount container body 232 is formed having a cup-like shape for inserting into a vehicle cup holder.

The cup holder adapter sleeve 240 is formed having a plurality of adapter winglets 244 projecting outward from an adapter body 242. The adapter body 242 is a tubular structure, preferably having a taper along a longitudinal axis. The cup holder adapter sleeve 240 can be fabricated via a molding process using a pliant material such as nylon or rubber. The cup holder adapter sleeve 240 can be clear for aesthetics. The cup holder adapter sleeve 240 is assembled onto the mount container body 232, providing a means for accommodating the vast variety of cup holder designs. The mount container body 232 would preferably have a taper sidewall, aiding in the assembly of the cup holder adapter sleeve 240 onto the mount container 230.

A splashguard cover portion 210 is removably secured to the bowl 201 via a detachably engaging interface provided between the snap latch ring 209 and a splashguard securing interface 212 of the splashguard cover portion 210. The splashguard securing interface 212 is formed about an outer perimeter of the splashguard cover portion 210. A water access opening 214 is formed through a central portion of the splashguard cover portion 210, providing access to objects disposed within the bowl 201. Although a snap feature is illustrated, other such designs a living hinge, a rotating post, clasp, hook and loop, sliding rails, a magnetic element, threads, or any other suitable lid securing means can be utilized for easily and quickly removing and attaching the splashguard cover portion 210 to the bowl 201. A vertical wall is provided about an opening perimeter, the wall providing a splashguard 218 on the portion projecting downward, and a lid receiving lip 216 on the portion projecting upward. The water access opening 214 can be sealed via coupling a cover 220 over the opening. A cover securing interface 224 is formed about an outer perimeter of the cover 220. The cover 220 is removably secured to the splashguard cover portion 210 via a detachably engaging interface provided between the cover securing interface 224 and the lid receiving lip 216. A release tab 226 is preferably incorporated onto the cover 220, easing the separation between the cover 220 from the splashguard cover portion 210. An identification 222 can be included in any form factor, such as a bossing as illustrated.

Figure 23:
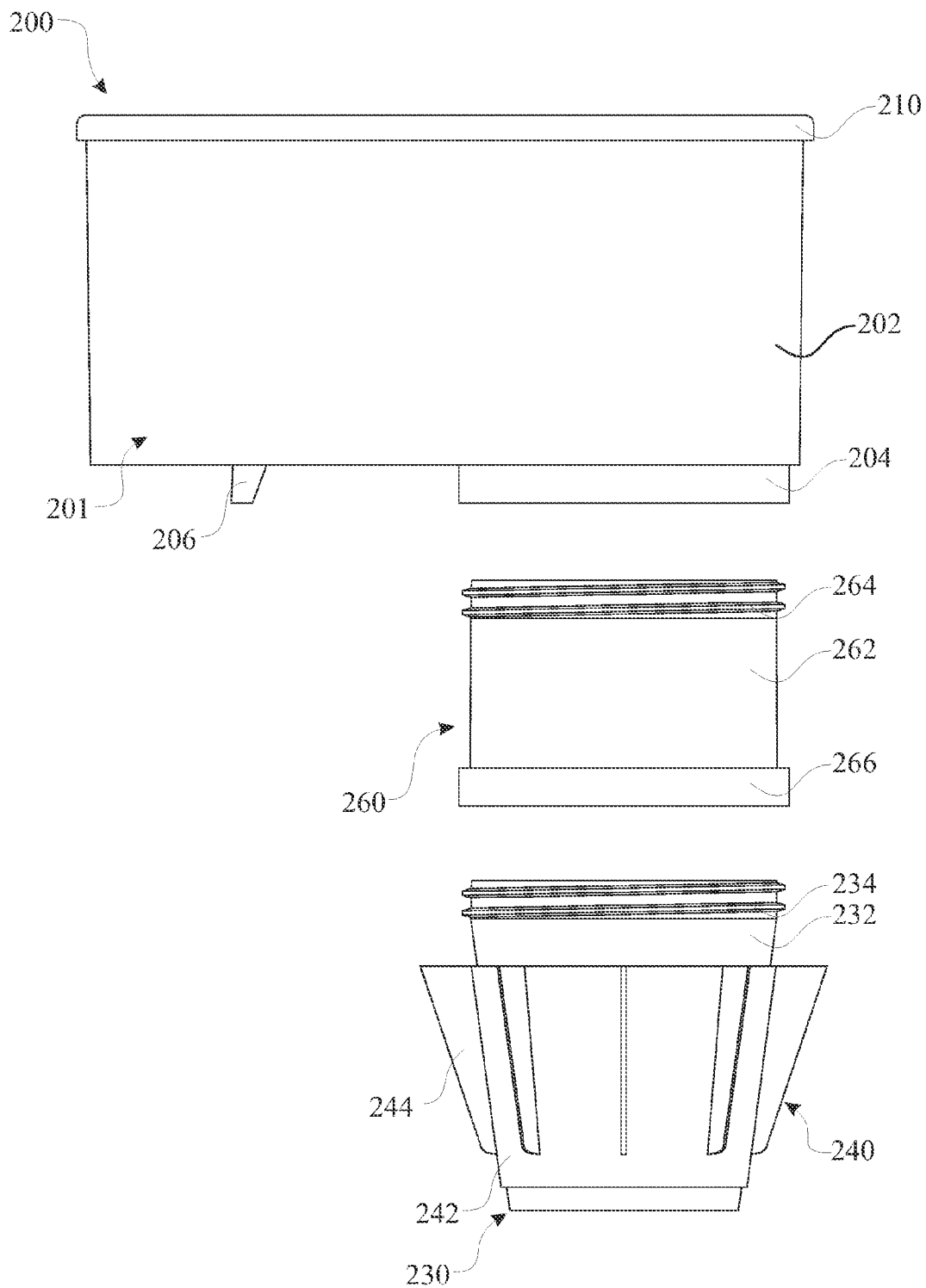
FIG. 23 is a side elevation view of the pet bowl assembly introducing an adapter extension component.

The design of the pet bowl assembly 200 can be enhance by providing a mount extension 260 for instances where the bowl 201 needs to be raised. The mount extension 260 can be assembled between the mount container 230 and the bowl 201, extending the overall effective length of the mount container 230 as shown in FIG. 23. The mount extension 260 is formed having an extension body 262 with an extension male threading 264 disposed upon a first end and an extension female threading 266 disposed upon an opposing end. The extension body 262 can be tubular, solid, comprising an internal seal, and the like. It is recognized that one or multiple extensions 260 can be utilized as required to obtain the desired height.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A pet bowl assembly comprising:
   a bowl including a bowl base and a vertical wall projecting upwards from a perimeter of said base, said bowl providing a fluid supporting container;
   a lid removably attached to said bowl for sealing said fluid within said bowl;
   the lid further comprising a splashguard cover portion comprising an outer perimeter and an inner perimeter, the inner perimeter defining an opening, the outer perimeter having a splashguard securing interface;
   and a cover being removably attachable to said splashguard cover portion, providing a seal for said splashguard cover portion opening; and
   a container including a base and sidewall defining a container receptacle for holding an object from a group of objects, the group comprising water, treats, and food;
   wherein said container is removably attached to a lower portion of said bowl base.

2. A pet bowl assembly as recited in claim 1, wherein said container includes a shape and size that dimensionally corresponds to a shape and size of a recess of a cup holder in a console of a vehicle.

3. A pet bowl assembly as recited in claim 2, said container further comprising an engaging interface disposed upon an upper portion of the container and a mating engaging interface disposed upon a lower surface of said bowl base.

4. A pet bowl assembly as recited in claim 3, wherein said mating engaging interface projects downward from said lower bowl base surface and said bowl further comprising a leveling feature disposed upon and projecting downward from said lower bowl base surface providing a level support for said bowl when placed onto a surface.

5. A pet bowl assembly as recited in claim 1, wherein said lid is removably attached to said bowl by any one of a snap-on feature, a living hinge, a magnet, a clip, a rotating post, a hook and loop, sliding rails, threads, or pressure detents.

6. A pet bowl assembly as recited in claim 1, said splashguard cover portion further comprising a splashguard extending inwardly from said splashguard cover portion a distance for preventing said water from spilling.

7. A pet bowl assembly comprising:
   a bowl including a bowl base and a vertical wall projecting upwards from a perimeter of said base, said bowl providing a fluid supporting container;
   a lid removably attached to said bowl for sealing said fluid within said bowl; and
   a container including a base and sidewall defining a container receptacle for holding an object from a group of objects, the group comprising water, treats, and food wherein said container having a shape and size that dimensionally corresponds to a shape and size of a recess of a cup holder in a console of a vehicle;
   a cup holder adapter removably attached to said container, the adapter comprising a pliant adapting design providing a means for compensating for dimensional differences between the container sidewall and the cup holder;
   wherein said container is removably attached to a lower portion of said bowl base via an engaging interface disposed upon an upper portion of the container and a mating engaging interface disposed upon a lower surface of said bowl base.

8. A pet bowl assembly as recited in claim 7, wherein said cup holder adapter comprises a plurality of plaint adapter winglets.

9. A pet bowl assembly as recited in claim 7, wherein said mating engaging interface disposed upon a lower surface of said bowl base projects downward from said lower bowl base surface and said bowl further comprising a leveling feature disposed upon and projecting downward from said lower bowl base surface providing a level support for said bowl when placed onto a surface.

10. A pet bowl assembly as recited in claim 7, wherein said pet bowl assembly further includes a splashguard, said splashguard being either separately attached within or integrated along an interior perimeter adjacent the upper inner edge of said bowl, said splashguard extending inwardly of said bowl a distance for preventing said water from spilling.

11. A pet bowl assembly as recited in claim 7, wherein said lid comprises at least two components, a splashguard cover portion and a cover;
    said splashguard cover portion comprising an outer perimeter and an inner perimeter, said inner perimeter defining an opening there through, a splashguard securing interface disposed about said outer perimeter of said splashguard cover portion; and
    wherein said cover is removably attachable to said splashguard cover portion, providing a seal for said splashguard cover portion opening.

12. A pet bowl assembly as recited in claim 11, said splashguard cover portion further comprising a splashguard extending inwardly from said splashguard cover portion a distance for preventing said water from spilling.

13. A pet bowl assembly comprising:
    a bowl including a bowl base and a vertical wall projecting upwards from a perimeter of said base, said bowl providing a fluid supporting container;
    a lid removably attached to said bowl for sealing said fluid within said bowl;
    the lid further comprising a splashguard cover portion comprising an outer perimeter and an inner perimeter, the inner perimeter defining an opening, the outer perimeter having a splashguard securing interface;
    and a cover being removably attachable to said splashguard cover portion, providing a seal for said splashguard cover portion opening; and
    a container including a base and sidewall defining a container receptacle for holding an object from a group of objects, the group comprising water, treats, and food wherein said container having a shape and size that dimensionally corresponds to a shape and size of a recess of a cup holder in a console of a vehicle;
    wherein said container is removably attached to a lower portion of said bowl base via an engaging interface disposed upon an upper portion of the container and a mating engaging interface disposed upon a lower surface of said bowl base.

14. A pet bowl assembly as recited in claim 13, wherein said mating engaging interface projects downward from said lower bowl base surface and said bowl further comprising a leveling feature disposed upon and projecting downward from said lower bowl base surface providing a level support for said bowl when placed onto a surface.

15. A pet bowl assembly as recited in claim 13, wherein said lid is removably attached to said bowl by any one of a snap-on feature, a living hinge, a magnet, a clip, a rotating post, a hook and loop, sliding rails, threads, or pressure detents.

16. A pet bowl assembly as recited in claim 13, said splashguard cover portion further comprising a splashguard extending inwardly from said splashguard cover portion a distance for preventing said water from spilling.

17. A pet bowl assembly as recited in claim 13, wherein said pet bowl assembly further includes a splashguard, said splashguard being either separately attached within or integrated along an interior perimeter adjacent the upper inner edge of said bowl, said splashguard extending inwardly of said bowl a distance for preventing said water from spilling.

18. A pet bowl assembly as recited in claim 13, wherein said engaging interface and mating engaging interface includes a component of any one of threads, a bayonet connection, a snap-on feature, a slide means, magnets or pressure detents.

* * * * *